(12) United States Patent
Chen et al.

(10) Patent No.: US 12,505,893 B2
(45) Date of Patent: Dec. 23, 2025

(54) MEMORY DEVICE, OPERATION METHOD THEREOF, AND READABLE STORAGE MEDIUM

(71) Applicant: Yangtze Memory Technologies Co., Ltd., Hubei (CN)

(72) Inventors: Wenping Chen, Wuhan (CN); Yaoyao Tian, Wuhan (CN); Da Li, Wuhan (CN); Wei Qi, Wuhan (CN); Shuai Zhang, Wuhan (CN); Hua Tan, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 108 days.

(21) Appl. No.: 18/437,123

(22) Filed: Feb. 8, 2024

(65) Prior Publication Data

US 2025/0087282 A1 Mar. 13, 2025

(30) Foreign Application Priority Data

Sep. 13, 2023 (CN) .......................... 202311188611.9

(51) Int. Cl.
| | | |
|---|---|---|
| *G11C 16/34* | (2006.01) | |
| *G11C 16/10* | (2006.01) | |
| *G11C 16/16* | (2006.01) | |

(52) U.S. Cl.
CPC ........ *G11C 16/3459* (2013.01); *G11C 16/102* (2013.01); *G11C 16/16* (2013.01)

(58) Field of Classification Search
CPC .... G11C 16/3459; G11C 16/102; G11C 16/16
See application file for complete search history.

(56) References Cited

U.S. PATENT DOCUMENTS

| 10,269,435 B1 | 4/2019 | Chen et al. |
|---|---|---|
| 2015/0220283 A1 | 8/2015 | Oh et al. |
| 2022/0051739 A1 | 2/2022 | Hwang et al. |
| 2022/0383954 A1* | 12/2022 | Choi .................. G11C 16/3459 |
| 2023/0195357 A1* | 6/2023 | Sharma ............... G06F 11/1012 |

FOREIGN PATENT DOCUMENTS

| CN | 111462804 A | 7/2020 |
|---|---|---|
| CN | 114067870 A | 2/2022 |
| JP | H11-16381 A | 1/1999 |

OTHER PUBLICATIONS

Office Action in Chinese Appln. No. 202311188611.9, mailed on Aug. 30, 2025, 23 pages (with English translation).

\* cited by examiner

*Primary Examiner* — Han Yang
(74) *Attorney, Agent, or Firm* — Fish & Richardson P.C.

(57) ABSTRACT

Examples of present disclosure disclose a memory device and an operation method thereof, and a readable storage medium. The memory device includes: a first memory region and a second memory region, each including a plurality of memory cells; and a peripheral circuit coupled with the first memory region and the second memory region and configured to: when writing data to the first memory region, perform a first program operation on memory cells to be programmed in the first memory region by using first program voltages that increase gradually; and when writing data in the first memory region to the second memory region, perform a second program operation on memory cells to be programmed in the second memory region by using second program voltages that increase gradually.

18 Claims, 8 Drawing Sheets

---

When writing data to a first memory region, perform a first program operation on memory cells to be programmed in the first memory region using first program voltages increasing gradually, wherein there is a first difference between the first program voltages at two adjacent times — S101

When writing data in the first memory region to a second memory region, perform a second program operation on memory cells to be programmed in the second memory region using second program voltages increasing gradually, wherein there is a second difference between the second program voltages at two adjacent times; wherein the second difference is less than the first difference — S102

MEMORY DEVICE, OPERATION METHOD THEREOF, AND READABLE STORAGE MEDIUM

CROSS-REFERENCE TO RELATED APPLICATIONS

This application claims priority to Chinese Patent Application No. 202311188611.9, filed on Sep. 13, 2023, which is hereby incorporated by reference in its entirety.

TECHNICAL FIELD

Examples of the present disclosure relate to the technical field of semiconductors, and particularly to a memory device, an operation method thereof, and a readable storage medium.

BACKGROUND

A memory device is a storage apparatus used to save information in modern information technologies. As a typical nonvolatile semiconductor memory, a NAND (Not-And) memory gradually becomes a mainstream product in the storage market due to a relatively high storage density, controllable production costs, appropriate program and erase speeds, and a retention characteristic.

However, with the increasingly high requirements for the storage apparatus, there is still much room for improvements in the memory device and a system thereof.

SUMMARY

According to a first aspect of examples of the present disclosure, a memory device is provided, which comprises:
  a first memory region and a second memory region, each comprising a plurality of memory cells; and
  a peripheral circuit coupled with the first memory region and the second memory region and configured to:
  when writing data to the first memory region, perform a first program operation on memory cells to be programmed in the first memory region using first program voltages increasing gradually, wherein there is a first difference between the first program voltages at two adjacent times; and
  when writing data in the first memory region to the second memory region, perform a second program operation on memory cells to be programmed in the second memory region using second program voltages increasing gradually, wherein there is a second difference between the second program voltages at two adjacent times; wherein the second difference is less than the first difference.

In some examples, the peripheral circuit is configured to:
  when the memory device is in an activated state, write the data to the first memory region and perform the first program operation on the memory cells to be programmed in the first memory region; and
  when the memory device is in an idle state, write the data in the first memory region to the second memory region and perform the second program operation on the memory cells to be programmed in the second memory region.

In some examples, a first program verify voltage of the first program operation is equal to a second program verify voltage of the second program operation.

In some examples, the first memory region comprises a plurality of first memory cells that store data using a single-bit mode, and the second memory region comprises a plurality of second memory cells that store data using a multi-bit mode.

In some examples, the first memory region comprises a faulty block, and the second memory region comprises a normal block.

In some examples, a proportion of garbage data in the first memory region is greater than a first preset proportion, and a proportion of garbage data in the second memory region is less than a second preset proportion.

In some examples, a number of program times of the memory cells in the first memory region is greater than a first preset number of times, and a number of program times of the memory cells in the second memory region is less than a second preset number of times.

In some examples, the peripheral circuit is configured to:
  after writing the data in the first memory region to the second memory region, perform an erase operation on the first memory region.

According to some aspects of the examples of the present disclosure, a memory device is provided, which comprises:
  a memory region comprising a plurality of memory cells; and
  a peripheral circuit coupled with the memory region and configured to:
  when the memory device is in an activated state, perform a first program operation on memory cells to be programmed in the memory region using first program voltages increasing gradually, wherein there is a first difference between the first program voltages at two adjacent times; and
  when the memory device is in an idle state, perform a second program operation on memory cells to be programmed in the memory region using second program voltages increasing gradually, wherein there is a second difference between the second program voltages at two adjacent times; wherein the second difference is less than the first difference.

In some examples, a first program verify voltage of the first program operation is equal to a second program verify voltage of the second program operation.

According to some aspects of the examples of the present disclosure, a memory system is provided, which comprises:
  a memory device comprising a first memory region and a second memory region each comprising a plurality of memory cells; and
  a memory controller coupled with the memory device and configured to send a first instruction and a second instruction;
  the memory device is configured to:
  in response to the first instruction, write data to the first memory region and perform a first program operation on memory cells to be programmed in the first memory region using first program voltages increasing gradually, wherein there is a first difference between the first program voltages at two adjacent times; and
  in response to the second instruction, write data in the first memory region to the second memory region and perform a second program operation on memory cells to be programmed in the second memory region using second program voltages increasing gradually, wherein there is a second difference between the second program voltages at two adjacent times; wherein the second difference is less than the first difference.

In some examples, the memory device is configured to:

when in an activated state, in response to the first instruction, write the data to the first memory region and perform the first program operation on the memory cells to be programmed in the first memory region; and when in an idle state, in response to the second instruction, write the data in the first memory region to the second memory region and perform the second program operation on the memory cells to be programmed in the second memory region.

In some examples, a first program verify voltage of the first program operation is equal to a second program verify voltage of the second program operation.

In some examples, the first memory region comprises a plurality of first memory cells that store data using a single-bit mode, and the second memory region comprises a plurality of second memory cells that store data using a multi-bit mode.

According to some aspects of the examples of the present disclosure, a memory system is provided, which comprises a memory device comprising a memory region having a plurality of memory cells; and a memory controller coupled with the memory device and configured to send a first instruction and a second instruction;

the memory device is configured to:

when in an activated state, in response to the first instruction, perform a first program operation on memory cells to be programmed in the memory region using first program voltages increasing gradually, wherein there is a first difference between the first program voltages at two adjacent times; and when in an idle state, in response to the second instruction, perform a second program operation on memory cells to be programmed in the memory region using second program voltages increasing gradually, wherein there is a second difference between the second program voltages at two adjacent times; wherein the second difference is less than the first difference.

In some examples, a first program verify voltage of the first program operation is equal to a second program verify voltage of the second program operation.

According to some aspects of the examples of the present disclosure, an operation method of a memory device is provided, which comprises:

when writing data to a first memory region, performing a first program operation on memory cells to be programmed in the first memory region using first program voltages increasing gradually, wherein there is a first difference between the first program voltages at two adjacent times; and when writing data in the first memory region to a second memory region, performing a second program operation on memory cells to be programmed in the second memory region using second program voltages increasing gradually, wherein there is a second difference between the second program voltages at two adjacent times; wherein the second difference is less than the first difference.

In some examples, when the memory device is in an activated state, data is written to the first memory region, and the first program operation is performed on the memory cells to be programmed in the first memory region;

when the memory device is in an idle state, the data in the first memory region is written to the second memory region, and the second program operation is performed on the memory cells to be programmed in the second memory region.

In some examples, a first program verify voltage of the first program operation is equal to a second program verify voltage of the second program operation.

In some examples, the first memory region comprises a plurality of first memory cells that store data using a single-bit mode, and the second memory region comprises a plurality of second memory cells that store data using a multi-bit mode.

In some examples, the first memory region comprises a faulty block, and the second memory region comprises a normal block.

In some examples, a proportion of garbage data in the first memory region is greater than a first preset proportion, and a proportion of garbage data in the second memory region is less than a second preset proportion.

In some examples, a number of program times of the memory cells in the first memory region is greater than a first preset number of times, and a number of program times of the memory cells in the second memory region is less than a second preset number of times.

In some examples, the operation method further comprises:

after writing the data in the first memory region to the second memory region, performing an erase operation on the first memory region.

According to some aspects of the examples of the present disclosure, an operation method of a memory device is provided, which comprises:

when the memory device is in an activated state, performing a first program operation on memory cells to be programmed in a memory region using first program voltages increasing gradually, wherein there is a first difference between the first program voltages at two adjacent times; and when the memory device is in an idle state, performing a second program operation on memory cells to be programmed in the memory region using second program voltages increasing gradually, wherein there is a second difference between the second program voltages at two adjacent times; wherein the second difference is less than the first difference.

In some examples, a first program verify voltage of the first program operation is equal to a second program verify voltage of the second program operation.

According to some aspects of the examples of the present disclosure, a readable storage medium storing a computer program is provided, wherein the computer program, when executed, implements the above operation methods.

In the examples of the present disclosure, when writing the data to the first memory region, a relatively small first difference is used to perform the first program operation with voltage increments on the memory cells to be programmed; when migrating the data in the first memory region to the second memory region, the second difference greater than the first difference is used to perform the second program operation with voltage increments on the memory cells to be programmed, causing threshold voltages of the memory cells with completed programmed states to converge and shift towards a threshold voltage decrease direction, and increasing an interval between threshold voltages of different states, so as to increase a read voltage distribution range of the second memory region, increase a data read window margin, increase a success rate of data reading, and improve data reliability.

Figure 1:
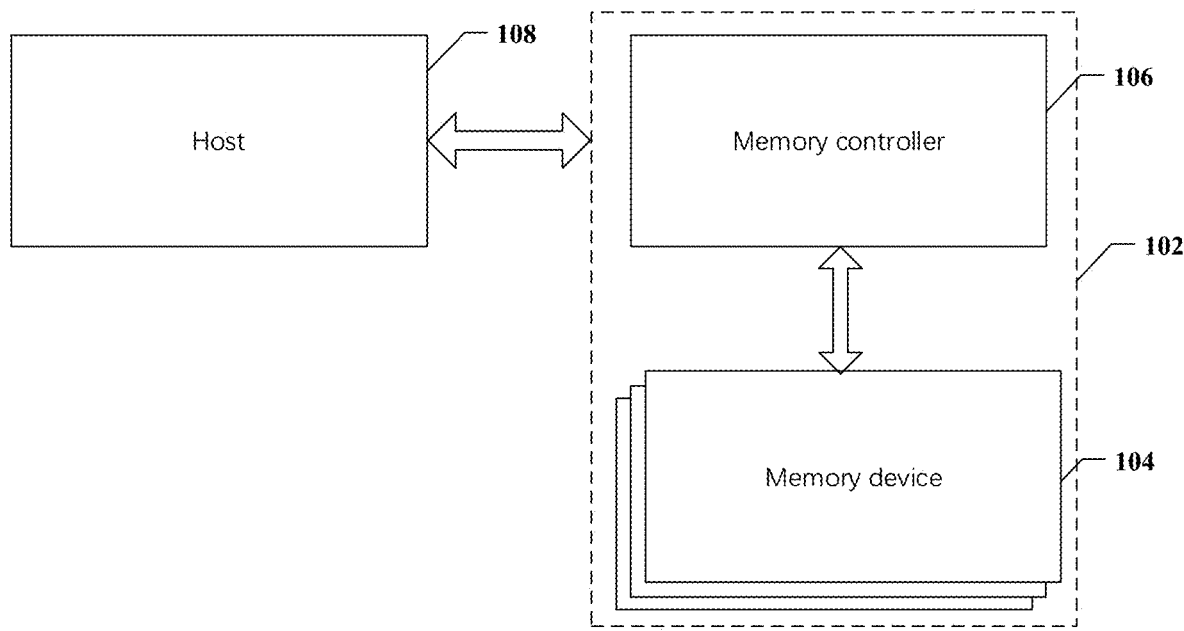
FIG. 1 is a schematic diagram of an example system having a memory system according to an example of the present disclosure.

In the aforementioned drawings (not necessarily drawn to scale), like reference numerals may describe like components in different views. Like reference numerals having different letter suffixes may represent different examples of like components. The drawings illustrate generally, by way of example, but not by way of limitation, various examples as discussed herein.

DETAILED DESCRIPTION

Example implementations disclosed by the present disclosure will be described below in more details with reference to the drawings. Although the example implementations of the present disclosure are shown in the drawings, it is to be understood that the present disclosure may be achieved in various forms which should not be limited by example implementations as set forth herein. Rather, these implementations are provided for a more thorough understanding of the present disclosure, and can fully convey the scope disclosed by the present disclosure to those skilled in the art.

In the following description, numerous example details are presented to provide a more thorough understanding of the present disclosure. However, it is apparent to those skilled in the art that the present disclosure may be practiced without one or more of these details. In other examples, in order to avoid confusing with the present disclosure, some technical features well-known in the art are not described; that is, not all features of actual examples are described herein, and well-known functions and structures are not described in detail.

In the drawings, sizes and relative sizes of layers, areas and elements may be exaggerated for clarity. Like reference numerals denote like elements throughout.

It should be understood that when an element or a layer is referred to as being "on", "adjacent to", "connected to", or "coupled to" other elements or layers, it may be directly on, adjacent to, connected to, or coupled to the other elements or layers, or intervening elements or layers may be present. In contrast, when an element is referred to as being "directly on", "immediately adjacent to", "directly connected to", or "directly coupled to" other elements or layers, no intervening elements or layers are present. It should be understood that, although the terms first, second, third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Thus, a first element, component, area, layer or portion discussed below may be represented as a second element, component, area, layer or portion, without departing from the teachings of the present disclosure. When the second element, component, area, layer or portion is discussed, it does not mean that the first element, component, area, layer or portion is necessarily present in the present disclosure.

The spatially relative terms, such as "beneath", "below", "lower", "under", "over", "upper", and the like, may be used herein for ease of description to describe one element or feature's relationship to other elements or features as illustrated in the figures. It should be understood that, the spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may include both upper and lower orientations. The device may be orientated otherwise (rotated by 90 degrees or other orientations), and the spatial descriptors used herein are interpreted accordingly.

The terms used herein are only intended to describe the example implementations, and are not used as limitations of the present disclosure. As used herein, unless otherwise indicated expressly in the context, "a", "an" and "the" in a singular form are also intended to include a plural form. It should also be understood that the terms "consist of" and/or "comprise", when used in this specification, determine the presence of a feature, integer, step, operation, element and/or component, but do not preclude the presence or addition of one or more of other features, integers, steps, operations, elements, components, and/or groups. As used herein, the term "and/or" includes any and all combinations of the listed relevant items.

In order to be capable of understanding the characteristics and the technical contents of the examples of the present disclosure in more detail, implementation of the examples of the present disclosure is set forth in detail below in conjunction with the drawings, and the appended drawings are only used for reference and illustration, instead of being used to limit the examples of the present disclosure.

It is to be understood that, references to "some examples" or "an example" throughout this specification mean that example features, structures, or characteristics related to the examples or example are included in at least one example of the present disclosure. Therefore, "in some examples" or "in an example" presented everywhere throughout this specification does not necessarily refer to the same example. Furthermore, these example features, structures, or characteristics may be incorporated in one or more examples in any suitable manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent advantages or disadvantages of the examples.

The methods disclosed in several method examples as provided by the present disclosure may be combined freely to obtain new method examples in case of no conflicts.

FIG. 1 shows a block diagram of an example system 100 having a memory device according to some aspects of the present disclosure. The system 100 may be a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatuses having storages therein. As shown in FIG. 1, the system 100 may comprise a host 108 and a memory system 102, and the memory system 102 has one or more memory devices 104 and a memory controller 106. The host 108 may be a processor of an electronic apparatus (e.g., a Central Processing Unit (CPU)) or a System on Chip (SoC) (e.g., an Application Processor (AP)). The host 108 may be configured to send data to or receive data from the memory devices 104.

According to some implementations, the memory controller 106 is coupled to the memory devices 104 and the host 108 and is configured to control the memory devices 104. The memory controller 106 can manage data stored in the memory devices 104 and communicate with the host 108. In some implementations, the memory controller 106 is designed for operating in a low duty-cycle environment, such as a Secure Digital (SD) card, a Compact Flash (CF) card, a Universal Serial Bus (USB) flash drive, or other media for use in electronic apparatuses, such as a personal computer, a digital camera, and a mobile phone, etc. In some implementations, the memory controller 106 is designed for operating in a high duty-cycle environment SSD or an embedded Multi-Media Card (eMMC) that is used as a data memory for a mobile apparatus, such as a smartphone, a tablet computer, and a laptop computer, etc., and an enterprise memory array.

The memory controller 106 may be configured to control operations of the memory devices 104, such as read, erase, and program operations. The memory controller 106 may be further configured to manage various functions with respect to data stored or to be stored in the memory devices 104, including, but not limited to, bad-block management, garbage collection, logical-to-physical address conversion, and wear leveling, etc. In some implementations, the memory controller 106 is further configured to process an Error Correction Code (ECC) with respect to data read from or written to the memory devices 104. The memory controller 106 may also perform any other suitable functions, such as formatting the memory devices 104. The memory controller 106 may communicate with an external apparatus (such as the host 108) according to a communication protocol. For example, the memory controller 106 may communicate with the external apparatus through at least one of various interface protocols, such as a USB protocol, an MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, and a Firewire protocol, etc.

Figure 2A:
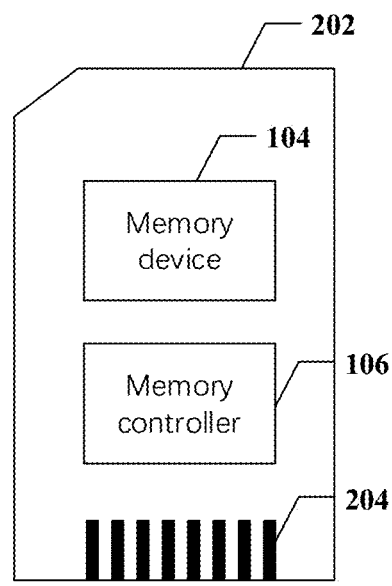
FIG. 2a is a schematic diagram of an example memory card having a memory system according to an example of the present disclosure.
Figure 2B:
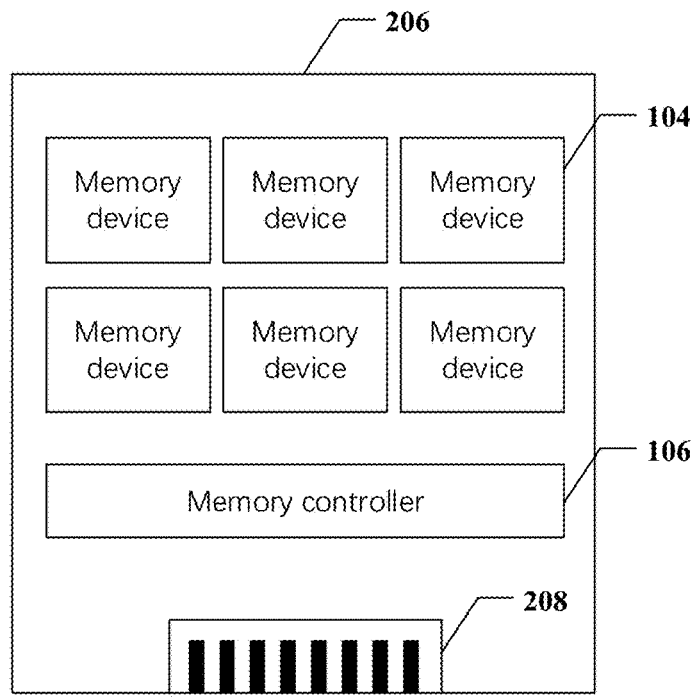
FIG. 2b is a schematic diagram of an example solid state drive having a memory system according to an example of the present disclosure.

The memory controller 106 and the one or more memory devices 104 can be integrated into various types of storage apparatuses, for example, be included in the same package (such as a Universal Flash Storage (UFS) package or an eMMC package). That is to say, the memory system 102 can be implemented and packaged into different types of end electronic products. In one example as shown in FIG. 2a, the memory controller 106 and a single memory device 104 may be integrated into a memory card 202. The memory card 202 may include a PC card (Personal Computer Memory Card International Association (PCMCIA)), a CF card, a Smart Media (SM) card, a memory stick, a multimedia card (MMC, RS-MMC, MMCmicro), an SD card (SD, miniSD, microSD, SDHC), and a UFS, etc. The memory card 202 may further comprise a memory card connector 204 that couples the memory card 202 with a host (e.g., the host 108 in FIG. 1). In another example as shown in FIG. 2b, the memory controller 106 and a plurality of memory devices 104 may be integrated into an SSD 206. The SSD 206 may further comprise an SSD connector 208 that couples the SSD 206 with a host (e.g., the host 108 in FIG. 1). In some implementations, a storage capacity of the SSD 206 is greater than a storage capacity of the memory card 202 and/or an operation speed of the SSD 206 is greater than an operation speed of the memory card 202.

Figure 3A:
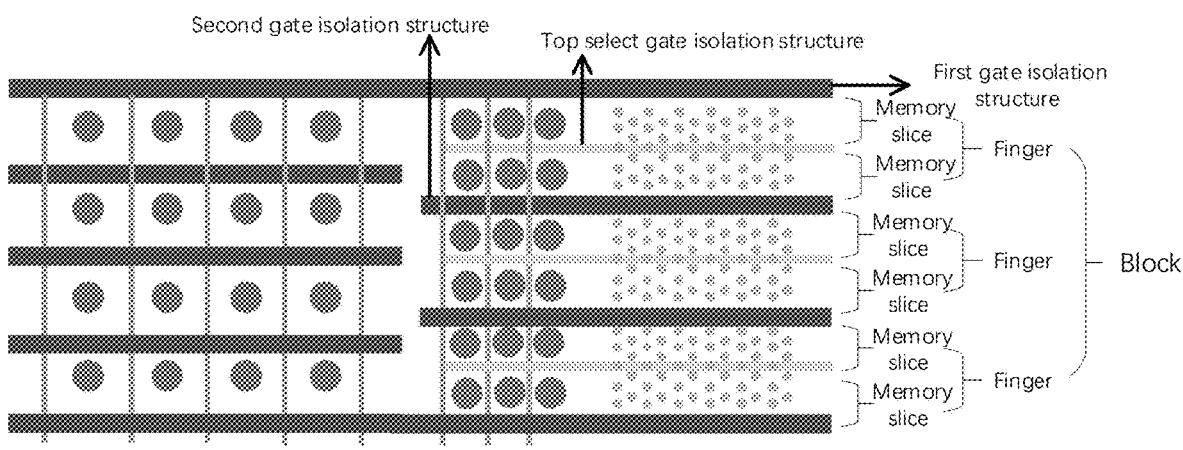
FIG. 3a is a schematic distribution diagram of memory cells of a three-dimensional NAND memory according to an example of the present disclosure.

FIG. 3a provides in an example a schematic structural diagram of a memory cell array of a three-dimensional NAND memory. As shown in FIG. 3a, the memory cell array of the three-dimensional NAND memory is composed of several parallel and staggered memory cell rows that are parallel to a gate isolation structure. Each two memory cell rows are separated by the gate isolation structure and a top select gate isolation structure, and each memory cell row comprises a plurality of memory cells. The gate isolation structure may comprise a first gate isolation structure and a second gate isolation structure. The first gate isolation structure divides the memory cell array into a plurality of blocks, and a plurality of second gate isolation structures may divide a block into a plurality of fingers. The top select gate isolation structure disposed in the middle of each finger may divide the finger into two portions, thus dividing the finger into two memory slices. One block as shown in FIG. 3a comprises 6 memory slices. In practical applications, the number of memory slices in one block is not limited thereto. Memory cells in one block coupled with a certain word line may be referred to as a page.

It is to be noted that the number of memory cell rows between the gate isolation structure and the top select gate isolation structure as shown in FIG. 3a is only an example illustration, which is not used to limit the number of memory cell rows contained in one finger of the three-dimensional NAND memory in the present disclosure. In practical applications, the number of memory cell rows contained in one finger may be adjusted to, for example, 2, 4, 8, and 16, etc., according to practical situations.

Figure 3B:
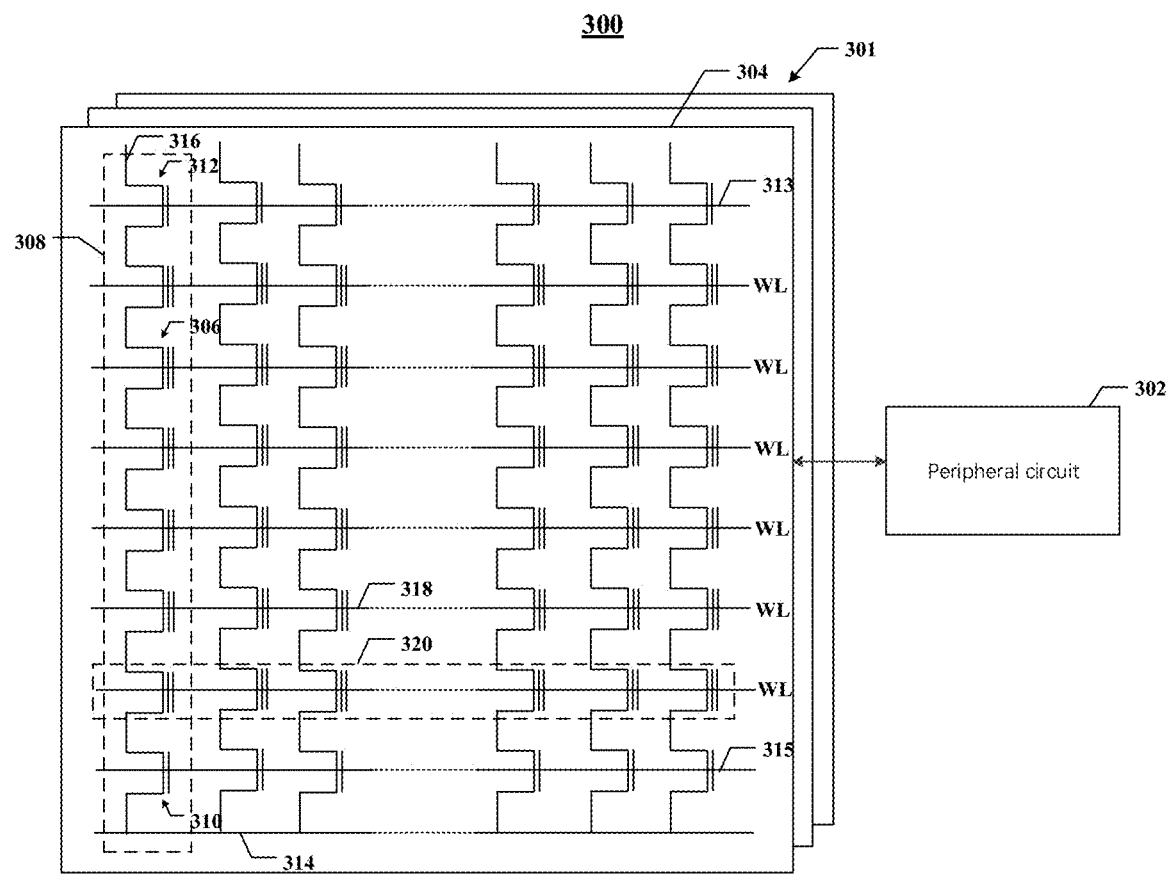
FIG. 3b is a schematic diagram of an example memory device comprising a peripheral circuit according to an example of the present disclosure.

FIG. 3b shows a schematic circuit diagram of an example memory device 300 comprising a peripheral circuit according to some aspects of the present disclosure. The memory device 300 may be an example of the memory device 104 in FIG. 1. The memory device 300 may comprise a memory cell array 301 and a peripheral circuit 302 coupled to the memory cell array 301. Taking the memory cell array 301 being a three-dimensional NAND memory cell array as an example for illustration, memory cells 306 are provided in an array of NAND memory strings 308, and each NAND memory string 308 extends vertically above a substrate (not shown). In some implementations, each NAND memory string 308 comprises a plurality of memory cells 306 that are coupled in series and stacked vertically. Each memory cell 306 can hold a continuous analog value, such as a voltage or charge, which depends on the number of electrons trapped within a region of the memory cell 306. Each memory cell 306 may be a floating gate memory cell that comprises a floating gate transistor, or a charge trap memory cell that comprises a charge trap transistor.

In some implementations, each memory cell 306 is a Single Level Cell (SLC) that has two possible memory states and thus can store one bit of data. For example, a first memory state "0" may correspond to a first voltage range, and a second memory state "1" may correspond to a second voltage range. In some implementations, each memory cell 306 is a Multiple Level Cell (MLC) that is capable of storing more than a single bit of data in more than four memory states. For example, the MLC can store two bits per cell, three bits per cell (also referred as a Triple Level Cell (TLC)), or four bits per cell (also known as a Quad Level Cell (QLC)). Each MLC may be programmed to adopt a range of possible nominal memory values. In one example, if each MLC stores two bits of data, the MLC may be programmed to write one of three possible nominal memory values to the cell, while a fourth nominal memory value other than the three nominal memory values may be used to represent an erased state.

As shown in FIG. 3b, each NAND memory string 308 may comprise a bottom select gate (BSG) 310 at a source terminal thereof and a top select gate (TSG) 312 at a drain terminal thereof. The BSG 310 and the TSG 312 may be configured to activate the selected NAND memory string 308 during read and program operations. In some implementations, sources of the NAND memory strings 308 in the same block 304 are coupled through the same source line (SL) 314 (e.g., a common SL). In other words, according to some implementations, all the NAND memory strings 308 in the same block 304 have an array common source (ACS). According to some implementations, the TSG 312 of each NAND memory string 308 is coupled to a corresponding bit line (BL) 316, and data can be read from or written to the bit line 316 via an output bus (not shown). In some implementations, each NAND memory string 308 is configured to be selected or unselected by applying a select voltage (e.g., greater than a threshold voltage of a transistor having the TSG 312) or an unselect voltage (e.g., 0 V) to the respective TSG 312 via one or more TSG lines 313 and/or by applying a select voltage (e.g., greater than a threshold voltage of a transistor having the BSG 310) or an unselect voltage (e.g., 0 V) to the respective BSG 310 via one or more BSG lines 315.

As shown in FIG. 3b, the NAND memory strings 308 can be organized into a plurality of blocks 304, and each of the plurality of blocks 304 may have a common source line 314 (e.g., coupled to the ground). In some implementations, each block 304 is a basic data unit for an erase operation, that is, all the memory cells 306 in the same block 304 are erased at the same time. In order to perform erasing on the memory cells 306 in a selected block 304a, an erase voltage (Vers) (e.g., a high positive voltage (such as 20 V or higher)) may be used to coupled with a bias to the source line 314 of the selected block 304a and an unselected block 304b in the same plane as the selected block 304a. It is to be understood that in some examples, an erase operation may be performed at a half block level, a quarter block level, or a level with any suitable number of blocks or any suitable fraction of a block. The memory cells 306 of the adjacent NAND memory strings 308 may be coupled through word lines 318, and the word lines 318 select which row of memory cells 306 is affected by the read and program operations. In some implementations, with reference to above FIG. 3a, a plurality of memory cells are separated from each other by the top select gate isolation structure and the gate isolation structure, the plurality of memory cells between the top select gate isolation structure and the gate isolation structure are arranged into a plurality of memory cell rows, and each memory cell row is parallel to the gate isolation structure and the top select gate isolation structure. The memory cells in a memory slice that share the same word line form a physical page 320. Each physical page 320 may be mapped to at least one logical page according to a storage mode (such as the SLC or MLC as mentioned above) of the corresponding memory cells 306, and the logical page may constitute a basic data unit for the program and read operations.

Figure 4:
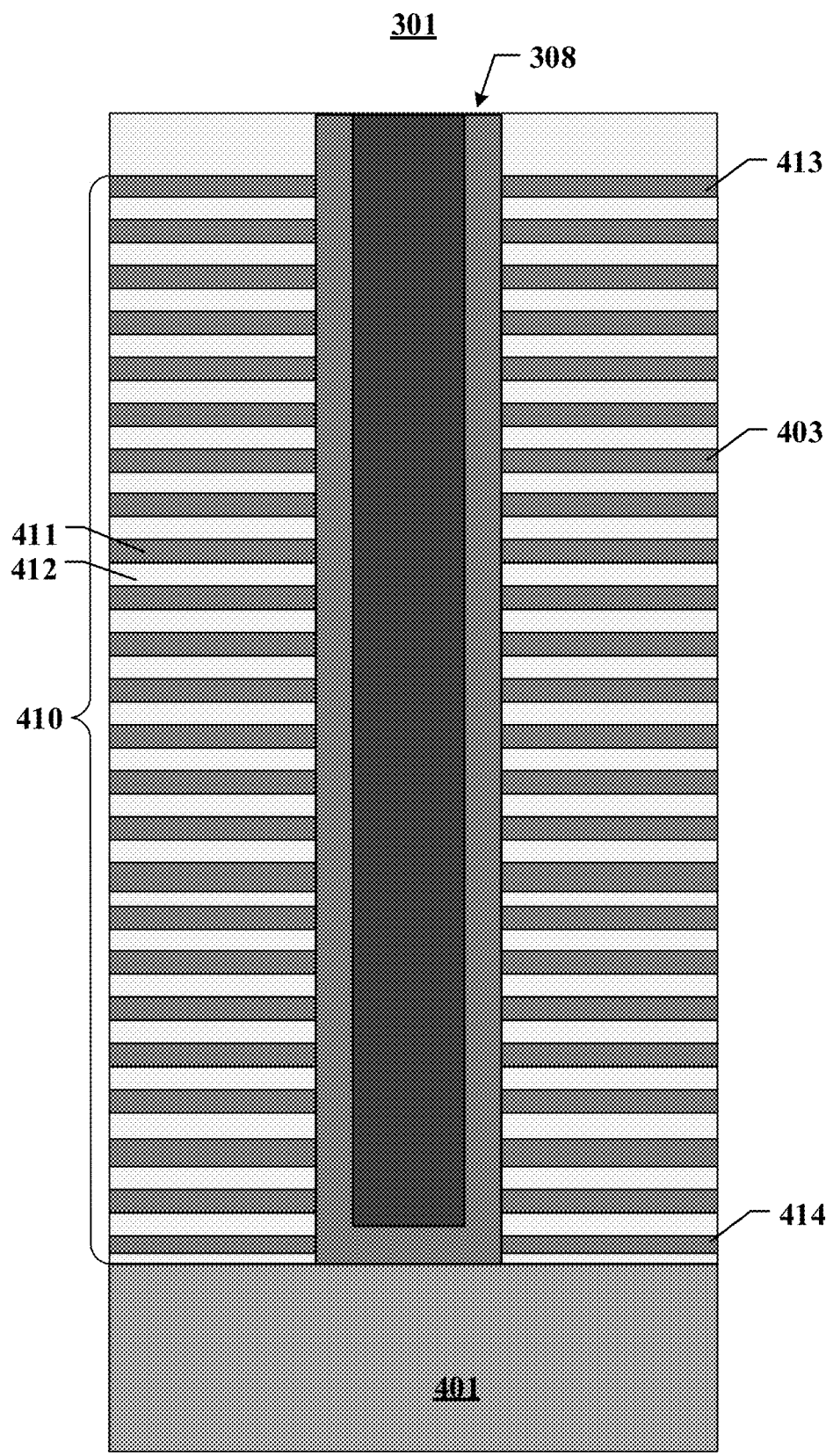
FIG. 4 is a schematic sectional diagram of a memory cell array comprising a NAND memory string according to an example of the present disclosure.

FIG. 4 shows a schematic sectional diagram of the example memory cell array 301 comprising the NAND memory string 308 according to some aspects of the present disclosure. As shown in FIG. 4, the NAND memory string 308 may comprise a stack structure 410 which comprises a plurality of gate layers 411 and a plurality of insulation layers 412 that are disposed in a stack alternately and sequentially, and the memory string 308 penetrating through the gate layers 411 and the insulation layers 412 vertically. The gate layers 411 and the insulation layers 412 may be stacked alternately, and two adjacent gate layers 411 are separated by one insulation layer 412. The number of pairs of the gate layers 411 and the insulation layers 412 in the stack structure 410 may determine the number of memory cells that are included in the memory array 301.

A constituent material of the gate layers 411 may include a conductive material. The conductive material includes, but is not limited to, tungsten (W), cobalt (Co), copper (Cu), aluminum (Al), polysilicon, doped silicon, silicide, or any combination thereof. In some implementations, each gate layer 411 comprises a metal layer, e.g., a tungsten layer. In some implementations, each gate layer 411 comprises a doped polysilicon layer. Each gate layer 411 may comprise a control gate surrounding the memory cells. The gate layer 411 at the top of the stack structure 410 may extend laterally as a top select gate line; the gate layer 411 at the bottom of the stack structure 410 may extend laterally as a bottom select gate line; and the gate layers 411 that extend laterally between the top select gate line and the bottom select gate line may act as word line layers.

In some examples, the stack structure 410 may be disposed on a substrate 401. The substrate 401 may include silicon (e.g., monocrystalline silicon), silicon germanium (SiGe), gallium arsenide (GaAs), germanium (Ge), silicon on insulator (SOI), germanium on insulator (GOI), or any other suitable materials.

In some examples, the NAND memory string 308 comprises a channel structure that extends through the stack structure 410 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel includes silicon, e.g., polysilicon. In some implementations, the memory film is a composite dielectric layer comprising a tunneling layer, a storage layer (also referred to as a "charge trap/storage layer"), and a blocking layer. The channel structure may have a cylindrical shape (e.g., a pillar shape). According to some implementations, the semiconductor channel, the tunneling layer, the storage layer, and the blocking layer are arranged radially from a center toward an outer surface of a pillar in this order. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In an example, the memory film may include a composite layer of silicon oxide/silicon oxynitride/silicon oxide (ONO).

Figure 5:
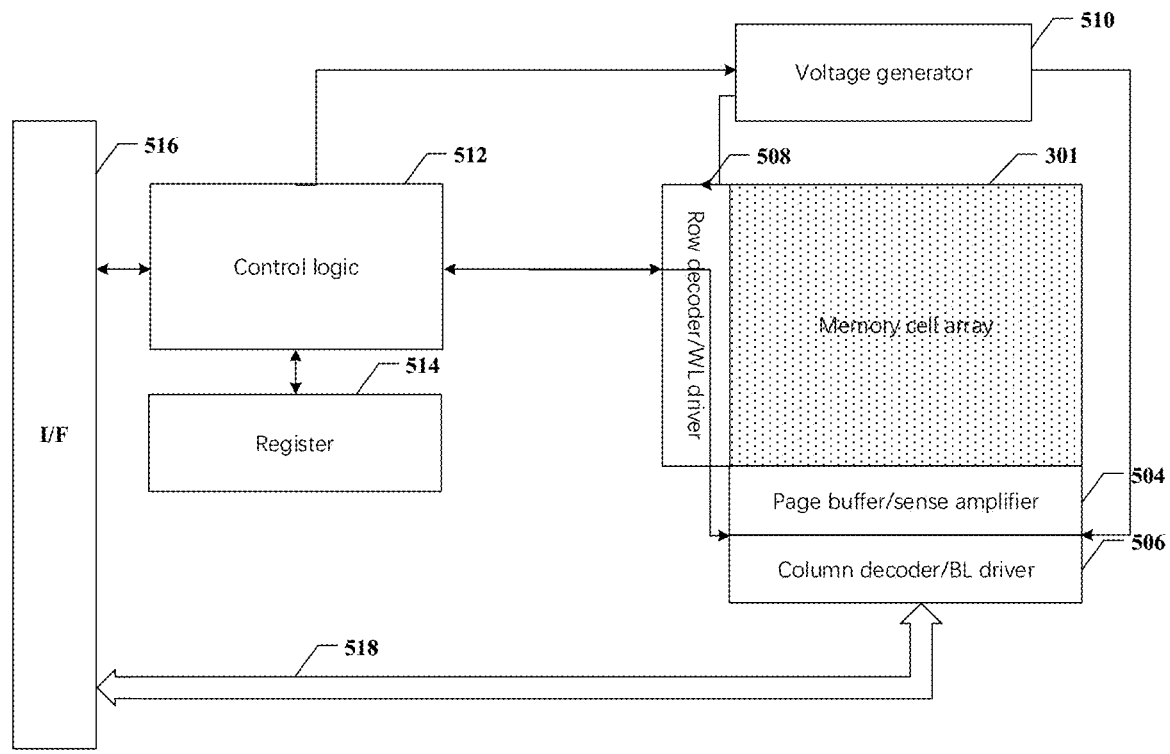
FIG. 5 is a schematic diagram of an example memory device comprising a memory cell array and a peripheral circuit according to an example of the present disclosure.

Referring back to FIG. 3b, the peripheral circuit 302 may be coupled to the memory cell array 301 through bit lines 316, the word lines 318, the source line 314, the BSG lines 315 and the TSG lines 313. The peripheral circuit 302 may include any suitable analog, digital, and hybrid signal circuits for facilitating operations of the memory cell array 301 by applying voltage signals and/or current signals to each target memory cell 306 and sensing voltage signals and/or current signals from each target memory cell 306 via the bit lines 316, the word lines 318, the source line 314, the BSG lines 315, and the TSG lines 313. The peripheral circuit 302 may include various types of peripheral circuits formed using a metal-oxide-semiconductor (MOS) technology. For example, FIG. 5 shows some example peripheral circuits. The peripheral circuit 302 comprises a page buffer/sense amplifier 504, a column decoder/bit line driver 506, a row decoder/word line driver 508, a voltage generator 510, a control logic 512, a register 514, an interface 516, and a data bus 518. It is to be understood that in some examples, an additional peripheral circuit not shown in FIG. 5 may also be included.

The page buffer/sense amplifier 504 may be configured to read data from and program (write) data to the memory cell array 301 according to control signals from the control logic 512. In an example, the page buffer/sense amplifier 504 may store one page of program data (write data) to be programmed into one page 320 of the memory cell array 301. In another example, the page buffer/sense amplifier 504 may perform a program verify operation to ensure that data is properly programmed into the memory cells 306 that are coupled to a selected word line 318. In yet another example, the page buffer/sense amplifier 504 may also sense low power signals from the bit lines 316 that represent data bits stored in the memory cells 306, and amplify a small voltage swing to a recognizable logic level during the read operation. The column decoder/bit line driver 506 may be configured to be controlled by the control logic 512 and select one or more NAND memory strings 308 by applying a bit line voltage generated from the voltage generator 510.

The row decoder/word line driver 508 may be configured to be controlled by the control logic 512, select/unselect the blocks 304 of the memory cell array 301, and select/unselect the word lines 318 of the blocks 304. The row decoder/word line driver 508 may be further configured to drive the word lines 318 using a word line voltage generated from the voltage generator 510. In some implementations, the row decoder/word line driver 508 may also select/unselect and drive the BSG lines 315 and the TSG lines 313. As described below in detail, the row decoder/word line driver 508 is configured to perform the program operation on the memory cells 306 that are coupled to (one or more) selected word lines 318. The voltage generator 510 may be configured to be controlled by the control logic 512 and generate a word line voltage (such as, a read voltage, a program voltage, a pass voltage, a channel boost voltage, and a verify voltage, etc.), a bit line voltage, and a source line voltage to be supplied to the memory cell array 301.

The control logic 512 may be coupled to each peripheral circuit as described above and configured to control operations of each peripheral circuit. The register 514 may be coupled to the control logic 512 and include a state register, a command register, and an address register for storing state information, command operation codes (OP codes), and command addresses for controlling the operations of each peripheral circuit. The interface 516 may be coupled to the control logic 512, and act as a control buffer to buffer and relay control commands received from a host (not shown) to the control logic 512 and state information received from the control logic 512 to the host. The interface 516 may also be coupled to the column decoder/bit line driver 506 via the data bus 518 and act as a data I/O interface and a data buffer to buffer and relay data to and from the memory array 301.

In some examples, when performing a program operation on memory cells, after the program voltage is applied to a selected word line, the verify voltage is required to be applied to the selected word line to verify whether a threshold single voltage of a programmed memory cell satisfies a threshold voltage of a preset programmed state, so as to determine whether the programming succeeds.

Figure 6:
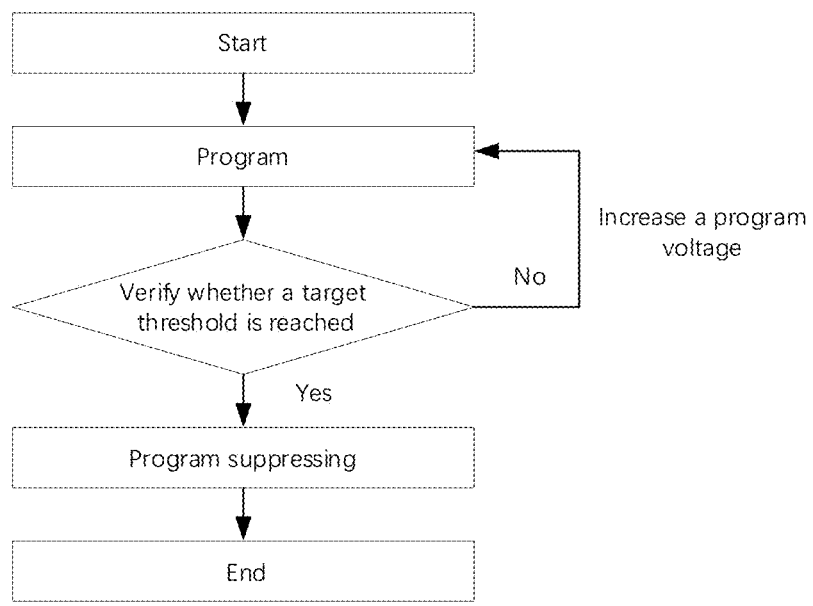
FIG. 6 is a schematic flow diagram of an increment step pulse program method according to an example of the present disclosure.

In some examples of the present disclosure, FIG. 6 shows a schematic flow diagram of an increment step pulse program (ISPP) method. During programming of a NAND memory, the page 320 in FIG. 3 may be a minimum data unit for one time of the program operation. Taking a certain memory cell in the page 320 as an example, before the programming starts, an erase operation may be performed on a block where the memory cell is located. After the programming starts, an initial program voltage is applied to a word line coupled with the memory cell to program the memory cell, and then a verify voltage is applied to the word line to verify whether the memory cell is programmed to a target threshold; if the target threshold is not reached, the memory cell is further programmed with a higher program voltage; and then verification is performed on the further programmed memory cell. The above program and verify processes are repeated until the threshold voltage of the memory cell is found to reach the target threshold in the verify process. At this time, the programming of the memory cell is completed. During subsequent program processes of other memory cells in the page 320, a program suppression voltage is applied to a bit line of the memory cell to prevent the memory cell from being programmed again. When threshold voltages of all the memory cells in this page are programmed to the target threshold, a program process of the entire page 320 ends. The increment step pulse program can perform programming by increasing the program voltage step by step, which can avoid a situation where one-time application of an excessive program voltage causes over-programming that triggers erasing and leads to reprogramming, and thus is favorable to the improvement of program efficiency.

Figure 7:
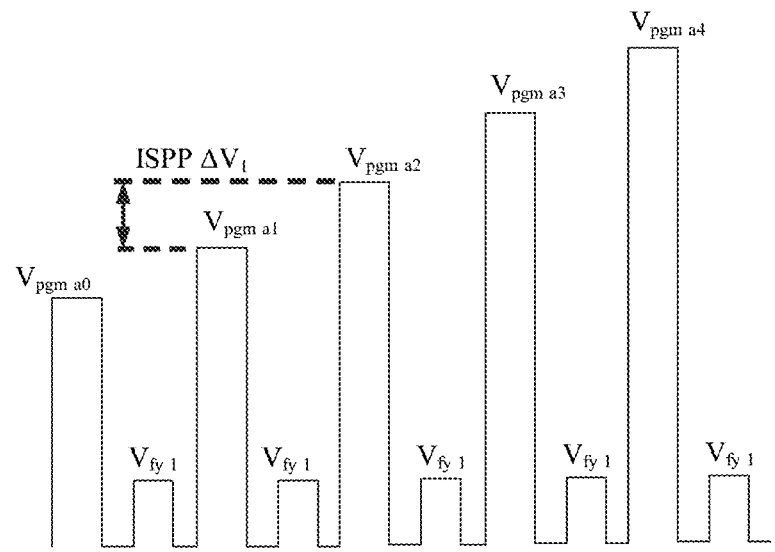
FIG. 7 is a schematic diagram of a program voltage and a verify voltage of a program operation according to an example of the present disclosure.

In some examples, FIG. 7 shows a schematic diagram of the program voltage and the verify voltage of the increment step pulse program method, and the programming may be denoted as a first program operation. In FIG. 7, Vpgm a0 may be an initial program voltage of the first program operation. After the Vpgm a0 is applied to the selected word line, a first program verify voltage Vfy 1 is applied to the selected word line to perform verification on the threshold voltage of a programmed memory cell. When the verification is not passed, the program voltage is increased to Vpgm a1 for a next time of the program operation. Vpgm a1 to Vpgm a4 shown in FIG. 7 are program voltages increasing gradually after multiple times of verification not passed. Once the verification is passed, the increment of the program voltage is no longer performed. Vpgm a1 to Vpgm a4 may be a plurality of first program voltages of the first program operation. An increment step pulse program voltage difference (ispp step) of each increment may be $\Delta V1$, i.e., an increment voltage value between the first program voltages at two adjacent times, that is, the first difference $\Delta V1$ is present between the first program voltages at two adjacent times. For example, the difference is present between Vpgm a1 and Vpgm a2 as shown in FIG. 7, and the first difference $\Delta V1$ may also be present between Vpgm a2 and Vpgm a3.

In the examples of the present disclosure, a range of the first difference $\Delta V1$ may be 0.05 V-0.6 V, for example, the first difference may be 0.4 V or 0.5 V. The first difference $\Delta V1$ may be tested, optimized, and configured based on various work conditions and user designs during a factory test phase of the memory device 104, and stored in a certain block within the memory device 104. When the memory device 104 is powered on, data comprising the first difference $\Delta V1$, the first program verify voltage Vfy 1, and other relevant parameters related to the program operation, the read operation, and the erase operation is read and cached in a register of the control logic or cached in other registers of the peripheral circuit, for the control logic to access and perform relevant operations on the memory cell array based on the parameters and data, wherein the operation may include, but are not limited to, the program operation, the read operation, or the erase operation. It should be noted that the Vpgm a1 to Vpgm a4 shown in FIG. 7 are merely examples, and there may be even more times of voltage increments when the verification is not passed, which is not limited in the examples of the present disclosure.

In some examples, under the control of the memory controller 106, the memory device 104 aperiodically performs data migration (refresh) operation on a memory region (e.g., a block) with data written thereto but having poor reliability, i.e., reading the data from the damaged or faulty block and then writing the data to a normal block. The operation may be also referred to as bad block management, which is used to improve the reliability of the memory device 104. Under the control of the memory controller 106, the memory device 104 migrates garbage data in a certain memory region to other regions, and this operation may be referred to as garbage collection. Under the control of the memory controller 106, the memory device 104 aperiodically reads data from a block programmed more times and then writes the data to a block programmed fewer times. This operation may be referred to as wear leveling, which is used to balance higher operation rates of various memory regions, reducing the occurrence of a significant rate drop after long use time of the memory device 104 and thereby optimizing user experience.

In some examples, the memory controller 106 can control the memory device 104 to perform the above bad block management, garbage collection, and wear leveling without host instructions, so as to maintain an operation rate and the reliability of the memory device 104. Generally, when there is no host access request, the memory controller 106 controls the memory device 104 to perform data transfer within the memory device 104, such as the bad block management and wear leveling. At this time, there is no need for the memory device 104 to provide data required by the host to the memory controller 106 or write data from the host to the memory cell array. In this example, the memory device 104 at this time may be defined as being in an idle state. After the memory device 104 completes the bad block management and the wear leveling, a physical-logical mapping table is updated and sent to the memory controller 106.

In some examples, the memory device 104 comprises a cache region having a faster operation rate than other non-cache region, e.g., having a faster program (write) rate. Data is first written to the cache region (e.g., a first memory region) through programming, and then written to the other non-cache region (e.g., a second memory region) after the cache region is full. After the data is written to the non-cache region, the relevant data in the cache region is erased to release a cache space, so as to prepare for a next time of writing. When data to be written to the memory device 104 is relatively small and a space of the cache region is sufficient for writing, the memory device 104 can migrate the data when being idle, so as to reduce resource occupation of interfaces between the memory controller 106 and the host. When the data to be written to the memory device 104 is relatively large and the space of the cache region is insufficient for writing, the memory device 104 may perform data migration in real time without waiting for the memory device 104 to enter the idle state. When a cache is full, data is migrated to the non-cache region, wherein multiple times of migration may be present. Finally, remaining data is migrated to the non-cache region when the memory device 104 is idle. An amount of data migrated to the non-cache region when the memory device 104 is idle is less than or equal to a capacity of the cache region. Taking the NAND memory as an example, the cache region may comprise a plurality of first memory cells that store data using a single-bit mode, such as the SLC; and the non-cache region may comprise a plurality of second memory cells that store data using a multi-bit mode, such as a two-bit memory cell MLC, a three-bit memory cell TLC, a four-bit memory cell QLC, or a five-bit memory cell PLC. Compared to the other memory cells, the SLC has only two memory states, one erased state and one programmed state, and has a faster program rate.

In some examples, during a fabrication process of the memory cell array of the memory device 104, all the memory cells thereof may be fabricated in accordance with a multi-bit memory cell, and then the multi-bit memory cell may be configured as the SLC. In an example, when the memory cell array is not configured with any cache SLC, all the memory cells are TLCs. Part of memory states of the TLC may be merged to form the SLC having two memory states, to be configured as the cache region. The capacity of the cache region may be a fixed value, which means configuration is finished upon leaving the factory, and may be 0-30% (e.g., 20%) of a total capacity, or may be determined dynamically by the memory controller 106 according to an amount of data required to be written currently and a remaining capacity of the memory device 104. For example, when the capacity of the memory device 104 is large enough, the memory controller 106 determines a portion of the non-cache region as the cache region, and the capacity of the cache region at this time is sufficient to store the data sent by the host; when the capacity of the memory device 104 is relatively small, the memory device 104 cannot determine a region sufficient to store the data sent by the host, and at this time 0-30% (e.g., 20%) of the remaining capacity of memory device 104 may be determined as the cache region. A division ratio of the memory region in the examples of the present disclosure is merely an example, and the examples of the present disclosure are not limited thereto.

In some examples, taking the memory device 104 with the SLC as the cache region and the TLC as the non-cache region as an example, data migration during bad block management, garbage collection, and wear leveling operations is data migration performed between the TLC memory cells, and data migration between cache and non-cache regions is migrating data in SLC memory cells to TLC memory cells. For the memory device 104 where no cache region is configured, the type of its internal memory cells may be consistent, and there is no data migration between memory cells of different numbers of bits. Regardless of a data migration mode, during increment step programming of the SLC cache or the TLC memory cell, in order to reduce program time, a relatively large voltage difference (the first difference $\Delta V1$) is adopted in each voltage increment. During data migration from the SLC cache to the TLC memory cell, a voltage difference for each increment during the programming of the TLC may be the same as a voltage difference for the SLC, so as to reduce the program time. Alternatively, during data migration between the TLC memory cells, a voltage difference for the programming of the TLC before the migration is equal to a voltage difference during the migration, so as to reduce the program time.

It should be noted that, as illustrated by the step voltage increments shown in FIG. 7 of the examples of the present disclosure, $\Delta V1$ is applicable to both TLC memory cells and a SLC cache; or for SLC memory cells with only one programmed state, $\Delta V1$ may be appropriately increased, so as to further improve the program efficiency. It should be noted that the first difference and a second difference introduced in the examples of the present disclosure are only for the differentiation between the step voltage increment differences adopted by two memory regions that are involved during the data migration. For example, an increment difference adopted by increment step programming of a memory cell before migration and to be migrated from is the first difference, and a memory cell to migrate to adopts the second difference. The first difference may vary for different memory devices 104, and first differences corresponding to different types of memory cells in the same memory device 104 may be the same or different.

In some examples, when the difference between the program voltages at two adjacent times is increased, that is, when the voltage difference for each voltage increment is increased, a threshold voltage distribution after the programming becomes wider, which leads to a decrease in a differentiation margin between threshold voltages of two adjacent ones of the programmed states to some extent, thereby resulting in a smaller data read window margin and an increase in a data read failure rate. In this regard, the examples of the present disclosure reduce the increment voltage difference during the data migration, so as to reduce a width of the threshold voltage distribution after the programming, increase the read window margin, and improve the read success rate.

According to some aspects of the examples of the present disclosure, as shown in FIG. 1, a memory device 104 is provided, and the memory device 104 may comprise:
  a first memory region and a second memory region, each comprising a plurality of memory cells; and
  a peripheral circuit coupled with the first memory region and the second memory region and configured to:
  when writing data to the first memory region, perform a first program operation on memory cells to be programmed in the first memory region using first program voltages increasing gradually, wherein there is a first difference between the first program voltages at two adjacent times; and
  when writing data in the first memory region to the second memory region, perform a second program operation on memory cells to be programmed in the second memory region using second program voltages increasing gradually, wherein there is a second difference between the second program voltages at two adjacent times; wherein the second difference is less than the first difference.

The first memory region and the second memory region may be pages comprising a plurality of memory cells, blocks comprising a plurality of pages, or planes comprising a plurality of blocks, which are not limited in the present disclosure. During a process of migrating the data in the first memory region to the second memory region, the entire data in the first memory region may be migrated as a whole to the second memory region, or part of the data in the first memory region is migrated to the second memory region while the other part of the data is migrated to other memory regions. The data migration process may comprise first reading the data in the first memory region, and then writing the data to the second memory region. Sizes of the first memory region and the second memory region may be the same or different.

The first memory region may be a cache region, while the second memory region is a non-cache memory region. The first memory region has a faster program rate compared to the second memory region. In some examples, the first memory region comprises a plurality of first memory cells that store data using a single-bit mode, and the second memory region comprises a plurality of second memory cells that store data using a multi-bit mode. For example, the first memory region may comprise SLC memory cells; and the second memory region may comprise two-bit memory cells MLC, three-bit memory cells TLC, four-bit memory cells QLC, or five-bit memory cells PLC. Compared to the other memory cells, an SLC has only two memory states, one erased state and one programmed state, and has a faster program rate. The SLC memory cells of the cache region may be obtained by configuring multi-bit memory cells as SLCs for use, i.e., obtained by merging part of memory states of the multi-bit memory cells. A capacity of the cache region may be a fixed value, or may be determined by a dynamic division of multi-bit memory cells by a memory controller 106, so as to provide a cache capacity sufficient to dealing with the writing of a large amount of data.

In some examples, no cache region is disposed in the memory device 104, and memory cells of the first memory region and the second memory region are of the same type, for example, both being TLCs or QLCs.

In some examples, referring to a schematic diagram of the increment step program voltages and verify voltages of the first program operation as shown in FIG. 7, Vpgm a0 to Vpgm a4 shown in FIG. 7 are the first program voltages corresponding to 5 times of program operations, ΔV1 is an increment voltage value for each time programming is not passed, i.e., the first difference between the first program voltages at two adjacent times, and Vfy 1 is the verify voltage corresponding to programming to a target memory state. This example does not limit the number of program times prior to a passed verification.

Figure 8:
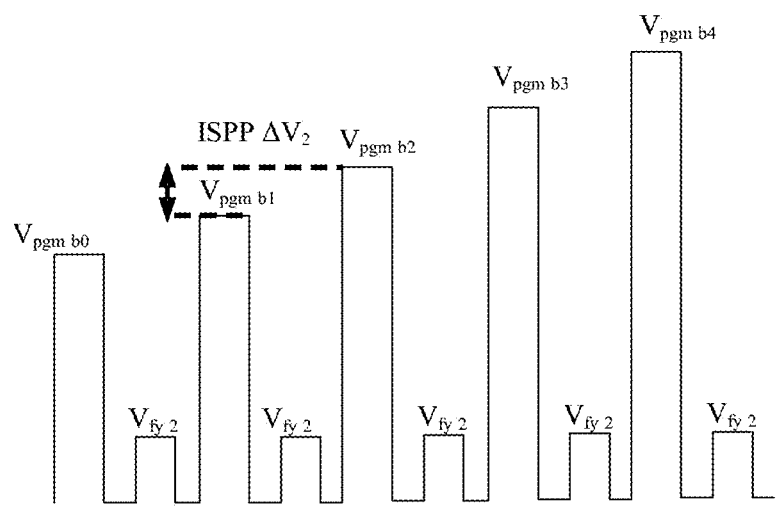
FIG. 8 is a schematic diagram of a program voltage and a verify voltage of another program operation according to an example of the present disclosure.

In some examples, referring to a schematic diagram of the increment step program voltages and verify voltages of the second program operation as shown in FIG. 8, Vpgm a0 to Vpgm a4 shown in FIG. 8 are the second program voltages corresponding to 5 times of program operations, ΔV2 is an increment voltage value for each time programing is not passed, i.e., the second difference between the second program voltages at two adjacent times, and Vfy 2 is the verify voltage corresponding to programming to a target memory state. This example does not limit the number of program times prior to a passed verification. The second difference ΔV2 in FIG. 8 is less than the first difference ΔV1 in FIG. 7, and the verify voltage Vfy 2 is the same as the verify voltage Vfy 1.

Figure 9:
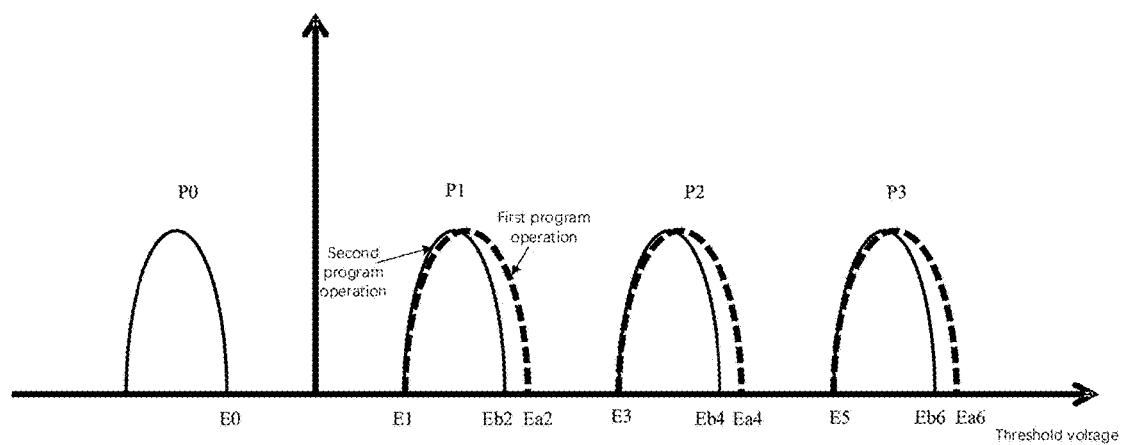
FIG. 9 is a schematic diagram of a threshold voltage shift corresponding to each memory state according to an example of the present disclosure.

In some examples, as shown in FIG. 9, taking a threshold voltage distribution of MLC-type memory cells comprising P0 to P4 memory states as an example for illustration, P0 is an erased state, and P1 to P3 are programmed states. The memory cells of the present application may comprise more or fewer memory states. In FIG. 9, dashed line peaks of a P1 state to a P3 state are schematic diagrams of threshold voltages of various memory states reached by the memory cells after a first program operation, and solid line peaks of P1 to P3 states are schematic diagrams of threshold voltages of various memory states reached by the memory cells after the second program operation. For a threshold voltage of one memory state, a verify voltage of the memory state is a minimum of a threshold voltage distribution peak. For example, a verify voltage of the P1 state is E1, a verify voltage of the P2 state is E3, and a verify voltage of the P3 state is E5. Generally, when a difference between the program voltages at two adjacent times of an increment step program process is reduced, a threshold voltage distribution is likely to shift towards a voltage decrease direction, and the threshold voltage distribution is also likely to become narrower. Verify voltages of the threshold voltages of each memory state of the two program operations may be equal, and a maximum of a threshold voltage distribution peak of various memory states after the second program operation shifts towards the voltage decrease direction, compared to that of the first program operation. Taking the P1 state in FIG. 9 as an example, a verify voltage of the P1 state reached after the second program operation performed using the smaller second difference ΔV2 is equal to a verify voltage in a case of performing the first program operation using the first difference ΔV1, with both being E1; and Eb2 of the P1 state reached after the second program operation performed using the smaller second difference ΔV2 is less than Ea2 of the P1 state reached after the first program operation performed using the first difference ΔV1.

During a read operation of the memory device 104, a read voltage is applied to a word line coupled with memory cells that require reading, so as to differentiate a threshold voltage distribution of the memory cells and determine memory states of the memory cells according to the threshold voltage distribution. For the first program operation, read voltages of the P1 state and the P2 state are Vread a1, Ea2≤Vread a1<E3. When Vread a1 is applied to the word line coupled with the selected memory cells, then the P1 state corresponds to a threshold voltage less than Vread a1, and the P2 state corresponds to a threshold voltage greater than Vread 1. For the second program operation, read voltages of the P1 state and the P2 state are Vread b1, Eb2≤Vread b1<E3; Eb2<Ea2, then a value range of Vread b1 may be greater than a value range of Vread a1. For an increment step pulse program method, reducing a voltage difference for each voltage increment may cause threshold voltages of the memory cells with completed programed states to converge and shift towards the threshold voltage decrease direction. On the premise of ensuring that the read voltage differentiating different memory states, a voltage value of the read voltage may be reduced, thereby reducing loads on devices such as a voltage generator and a word line. Configuring an invariable verify voltage may cause the threshold voltage distribution peak of the memory cells to converge on one side, while reducing a task pressure on the voltage generator caused by a plurality of verify voltages and avoiding an increase in firmware operations, so as to increase an interval between threshold voltages of different states, increase the value range of the read voltage, improve a data read window margin, and improve a read success rate.

In FIG. 9, the memory cells subjected to the first program operation are of the same type as the memory cells subjected to the second program operation, and the memory cells subjected to the second program operation may also have more memory states. A situation of the threshold voltage shift of the memory cells after the two program operations in FIG. 9 is only used for exemplary illustration of principles of the examples of the present disclosure, does not limit values of the threshold voltages, verify voltages, and read voltages of the relevant memory states of the memory device 104. The first difference ΔV1 of the first program operation and the second difference ΔV2 of the second program operation may be tested and determined upon leaving the factory, and stored in the memory device 104 for calling by the memory device 104. If there is no data migration except migrating the data in the first memory region to the second memory region by performing the first program operation on the first memory region and performing the second program operation on the second memory region, programming any memory region may also adopt the second program operation with the smaller second difference ΔV2, so as to improve the data read window margin and improve the read success rate.

In some implementations, the first memory region of the examples of the present disclosure may be a cache region comprising a plurality of SLC memory cells, and the second memory region may comprise a plurality of multi-bit memory cells. During writing to the memory device 104 through programming, data from a host is first written to the first memory region, and then migrated from the first memory region to the second memory region. The SLC of the first memory region comprises the P0 erased state and the P1 programmed state in FIG. 10, and the second memory region may comprise the P0 erased state, and the P1 to P3 programmed states, or more programmed states that are not shown. The second memory region is programmed using the increment step programming with the smaller second difference ΔV2, so as to increase the interval between the threshold voltages of different states, increase the value range of the read voltage, increase the data read window margin, and increase the read success rate. It is to be understood that the threshold voltages of the multi-bit memory cells programmed by the first program operation are not shown in FIG. 10 and may be referred to the schematic diagram of the threshold voltages obtained after the first program operation in FIG. 9, which have a read window margin smaller than that of a second read operation.

Figure 10:
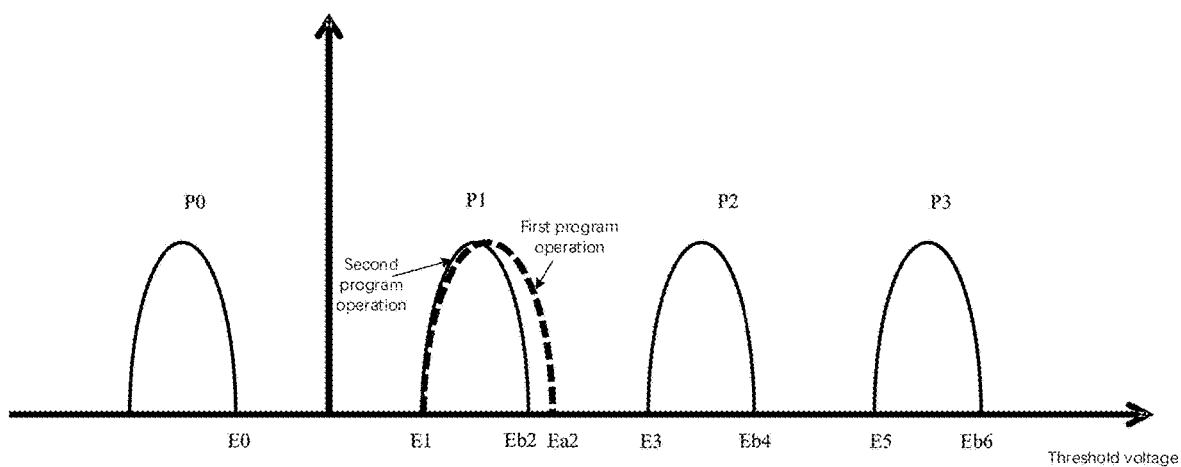
FIG. 10 is a schematic diagram of another threshold voltage shift corresponding to each memory state according to an example of the present disclosure.

It should be noted that, in FIG. 10, the verify voltage of the P1 state of the SLC memory cells in the first memory region may be equal, or equal in a certain error range, to the verify voltage of the P1 state of the multi-bit memory cells in the second memory region, or the verify voltage of the P1 state of the SLC memory cells in the first memory region may be equal to the verify voltage of the P2 state, the P3 state, the P4 state or the P5 state, of the multi-bit memory cells in the second memory region. Compared to the use of the larger first voltage difference $\Delta V1$, the use of the second voltage difference $\Delta V2$ to perform the second program operation may obtain a larger read window margin.

In some examples, when the first memory region is the cache region comprising a plurality of SLC memory cells, the first difference $\Delta V1$ shown in FIG. 7 may be applied, or a first difference larger than $\Delta V1$ may be adopted to accelerate the programming. The SLC memory cells of the cache region of the examples of the present disclosure may be achieved through firmware configuration of the multi-bit memory cells in the second memory region. The first difference $\Delta V1$ same as that of the multi-bit memory cells without configured with a cache region may be used to reduce changes to firmware and simplify a control procedure.

In some examples, the first memory region comprises a faulty block, and the second memory region comprises a normal block. The memory controller 106 controls the memory device to perform a bad block management operation, so as to migrate data in the faulty block to the normal block, thereby reducing a data damage risk and improving the reliability of the memory device 104.

In some examples, a proportion of garbage data in the first memory region is greater than a first preset proportion, and a proportion of garbage data in the second memory region is less than a second preset proportion. The memory controller 106 controls the memory device to perform a garbage collection operation. When a proportion of garbage data in the first memory region or data stored in discontinuous blocks occupying a capacity of the region is greater than the first preset proportion, garbage collection is started to migrate the data to the second memory region with a smaller proportion of garbage data, and during writing to the second memory region through, the data may be written to consecutive physical addresses in the second region to improve memory utilization. The first preset proportion and the second preset proportion may be the same or different, and may be tested, determined and recorded in the memory device 104 during a factory test phase for calling and execution by relevant firmware.

In some examples, a number of program times of the memory cells in the first memory region is greater than a first preset number of times, and a number of program times of the memory cells in the second memory region is less than a second preset number of times. The memory device 104 performs a wear leveling operation under the control of the memory controller 106, so as to migrate data in the first memory region programmed more times to the second memory region programmed fewer times, thereby reducing a data loss risk.

During the data migration process of the examples of the present disclosure, the second program operation using the second difference greater than the first difference for a voltage increment is performed to program the memory cells to be programmed, so as to increase a read voltage distribution range of the second memory region, improve the data read window margin, improve the data read success rate, and improve the data reliability.

In some examples, the peripheral circuit is configured to:
after writing the data in the first memory region to the second memory region, perform an erase operation on the first memory region.

In some examples, a first program verify voltage of the first program operation is equal to a second program verify voltage of the second program operation.

In some examples, the peripheral circuit is configured to:
when the memory device 104 is in an activated state, write the data to the first memory region and perform the first program operation on the memory cells to be programmed in the first memory region; and
when the memory device 104 is in an idle state, write the data in the first memory region to the second memory region and perform the second program operation on the memory cells to be programmed in the second memory region.

In some examples, the memory controller 106 can control the memory device 104 to perform the above bad block management, garbage collection, and wear leveling without host instructions, so as to maintain an operation rate and the reliability of the memory device 104. Generally, when there is no host access request, the memory controller 106 controls the memory device 104 to perform data transfer within the memory device 104, such as the bad block management, the garbage collection, and the wear leveling. At this time, there is no need for the memory device 104 to provide data required by the host to the memory controller 106 or write data from the host to the memory cell array. In this example, the memory device 104 at this time may be defined as being in an idle state. After the memory device 104 completes the bad block management and the wear leveling, a physical-logical mapping table is updated and sent to the memory controller 106. On the other hand, when the host is required to read data from the memory device 104 or an erase or program operation is to be performed in real time on the memory device 104 currently, the memory device 104 is in the activated state at this time.

It may be understood that when the host is required to obtain data feedback of the memory device 104 in real time, the memory device 104 is required to have a faster operation response. As shown in FIGS. 9 and 10, when the verify voltage is invariable and the program operation is performed with increment step voltage increments, performing the step-by-step voltage increments with the smaller second difference $\Delta V2$ leads to longer program operation time. In this example, when the memory device 104 is in the activated state, the larger first difference $\Delta V1$ is used to perform increment step programming, so as to shorten the program time and achieve a high speed response. When the memory device 104 is idle, there is no need for the memory device 104 to respond quickly at this time, and the smaller second difference $\Delta V2$ is used to perform increment step programming, so as to achieve a larger data read window margin, increase the data read success rate, and improve the data stability.

In some examples, the memory device 104 comprises a cache region having a faster operation rate than other non-cache region, e.g., having a faster program (write) rate. Data is first written to the cache region (e.g., the first memory region) through programming, and then written to the other non-cache region (e.g., the second memory region) after the cache region is full. After the data is written to the non-cache region, the relevant data in the cache region is erased to release a cache space, so as to prepare for a next time of writing. When data to be written to the memory device 104 is relatively small and a space of the cache region is sufficient for writing, the memory device 104 can migrate the data when being idle, so as to reduce resource occupation of interfaces between the memory controller 106 and the host. When the data to be written to the memory device 104 is relatively large and the space of the cache region is insufficient for writing, the memory device 104 may perform data migration in real time without waiting for the memory device 104 to enter the idle state. When a cache is full, data is migrated to the non-cache region, wherein multiple times of migration may be present. Then, remaining data is migrated to the non-cache region when the memory device 104 is idle. An amount of data migrated to the non-cache region when the memory device 104 is idle is less than or equal to a capacity of the cache region.

According to some aspects of the examples of the present disclosure, a memory device 104 is provided, which comprises:
 a memory region comprising a plurality of memory cells; and
 a peripheral circuit coupled with the memory region and configured to:
 when the memory device 104 is in an activated state, perform a first program operation on memory cells to be programmed in the memory region using first program voltages increasing gradually, wherein there is a first difference between the first program voltages at two adjacent times; and
 when the memory device 104 is in an idle state, perform a second program operation on memory cells to be programmed in the memory region using second program voltages increasing gradually, wherein there is a second difference between the second program voltages at two adjacent times; wherein the second difference is less than the first difference.

In the examples of the present disclosure, the first program operation and the second program operation are applicable to any memory region of the memory device 104, and are not limited to data migration processes. When the memory device 104 is in the activated state, the larger first difference ΔV1 is used to perform increment step programming, so as to shorten the program time and achieve a high speed response. When the memory device 104 is idle, there is no need for the memory device 104 to respond quickly at this time, and the smaller second difference ΔV2 is used to perform increment step programming, so as to achieve a larger data read window margin, increase the data read success rate, and improve the data stability.

In some examples, a first program verify voltage of the first program operation is equal to a second program verify voltage of the second program operation.

According to some aspects of the examples of the present disclosure, a memory system is provided, which comprises:
 a memory device 104 comprising a first memory region and a second memory region, each comprising a plurality of memory cells; and
 a memory controller 106 coupled with the memory device 104 and configured to send a first instruction and a second instruction;
 wherein, the memory device 104 is configured to:
 in response to the first instruction, write data to the first memory region and perform a first program operation on memory cells to be programmed in the first memory region using first program voltages increasing gradually, wherein there is a first difference between the first program voltages at two adjacent times; and
 in response to the second instruction, write data in the first memory region to the second memory region and perform a second program operation on memory cells to be programmed in the second memory region using second program voltages increasing gradually, wherein there is a second difference between the second program voltages at two adjacent times; wherein the second difference is less than the first difference.

Operation parameters such as the first difference, a verify voltage, and an initial program voltage, of the first program operation may be determined and written to a relevant memory region of the memory device 104 during a factory test phase of the memory device 104, and when the memory device 104 is powered on, may be read and cached in a relevant register of the peripheral circuit for calling by a control logic, so as to execute relevant operations. The control logic receives the first instruction through an interface 516 in FIG. 5, obtains program operation parameters on the relevant register, and adopts the first program operation to program the first memory region. The control logic receives the second instruction through the interface 516 in FIG. 5, reads data from the first memory region, obtains the program operation parameters on the relevant register, and adopts the second program operation to program data in the first memory region to the second memory region. The first instruction and the second instruction, may comprise address information of the relevant memory region, or the relevant address information is sent to the memory controller simultaneously or sequentially with the first instruction and with the second instruction.

In some examples, the memory device 104 is configured to:
 when in an activated state, in response to the first instruction, write the data to the first memory region and perform the first program operation on the memory cells to be programmed in the first memory region; and
 when in an idle state, in response to the second instruction, write the data in the first memory region to the second memory region and perform the second program operation on the memory cells to be programmed in the second memory region.

In some examples, a first program verify voltage of the first program operation is equal to a second program verify voltage of the second program operation.

In some examples, the first memory region comprises a plurality of first memory cells that store data using a single-bit mode, and the second memory region comprises a plurality of second memory cells that store data using a multi-bit mode.

According to some aspects of the examples of the present disclosure, a memory system is provided, which comprises a memory device 104 comprising a memory region having a plurality of memory cells; and
 a memory controller 106 coupled with the memory device 104 and configured to send a first instruction and a second instruction;
 wherein the memory device 104 is configured to:
 when in an activated state, in response to the first instruction, perform a first program operation on memory cells to be programmed in the memory region using first program voltages increasing gradually, wherein there is a first difference between the first program voltages at two adjacent times; and
 when in an idle state, in response to the second instruction, perform a second program operation on memory cells to be programmed in the memory region using second program voltages increasing gradually, wherein there is a second difference between the second program voltages at two adjacent times; wherein the second difference is less than the first difference.

In some examples, a first program verify voltage of the first program operation is equal to a second program verify voltage of the second program operation.

Figure 11:
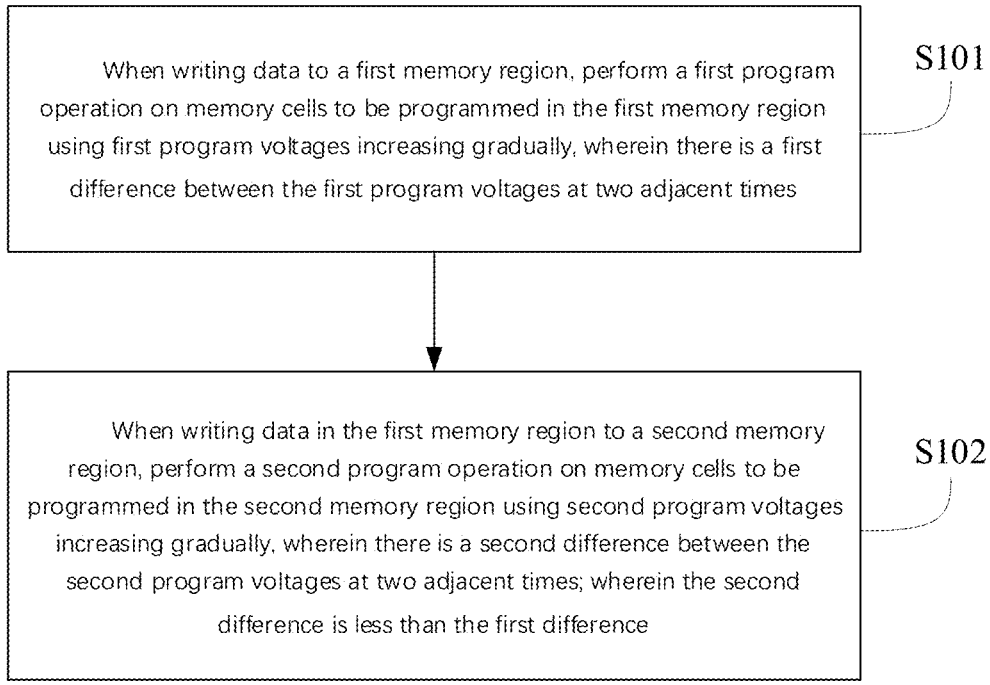
FIG. 11 is a schematic flow diagram of an operation method of a memory device according to an example of the present disclosure.

According to some aspects of the examples of the present disclosure, FIG. 11 shows a schematic diagram of an operation method of a memory device 104, which comprises:

when writing data to a first memory region, performing a first program operation on memory cells to be programmed in the first memory region using first program voltages increasing gradually, wherein there is a first difference between the first program voltages at two adjacent times; and when writing data in the first memory region to a second memory region, performing a second program operation on memory cells to be programmed in the second memory region using second program voltages increasing gradually, wherein there is a second difference between the second program voltages at two adjacent times; wherein the second difference is less than the first difference.

In some examples, when the memory device 104 is in an activated state, when writing the data to the first memory region, the first program operation is performed on the memory cells to be programmed in the first memory region.

When the memory device 104 is in an idle state, when writing data in the first memory region to a second memory region, the second program operation is performed on the memory cells to be programmed in the second memory region.

In some examples, a first program verify voltage of the first program operation is equal to a second program verify voltage of the second program operation.

In some examples, the first memory region comprises a plurality of first memory cells that store data using a single-bit mode, and the second memory region comprises a plurality of second memory cells that store data using a multi-bit mode.

In some examples, the first memory region comprises a faulty block, and the second memory region comprises a normal block.

In some examples, a proportion of garbage data in the first memory region is greater than a first preset proportion, and a proportion of garbage data in the second memory region is less than a second preset proportion.

In some examples, a number of program times of the memory cells in the first memory region is greater than a first preset number of times, and a number of program times of the memory cells in the second memory region is less than a second preset number of times.

In some examples, the operation method further comprises:

after writing the data in the first memory region to the second memory region, performing an erase operation on the first memory region.

Figure 12:
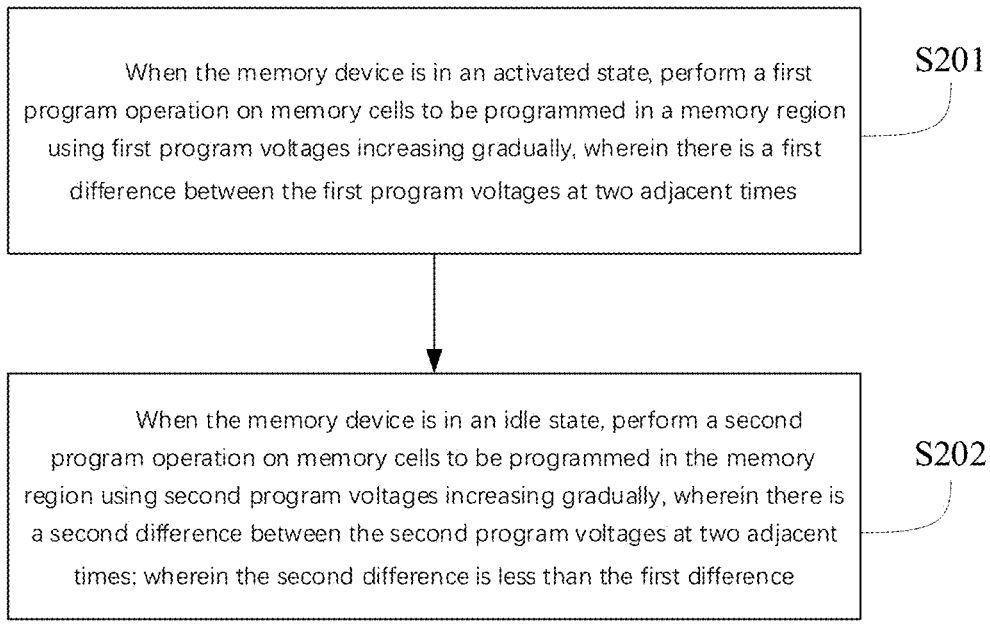
FIG. 12 is a schematic flow diagram of another operation method of a memory device according to an example of the present disclosure.

According to some aspects of the examples of the present disclosure, FIG. 12 provides an operation method of a memory device 104, which comprises:

when the memory device 104 is in an activated state, performing a first program operation on memory cells to be programmed in a memory region using first program voltages increasing gradually, wherein there is a first difference between the first program voltages at two adjacent times; and when the memory device 104 is in an idle state, performing a second program operation on memory cells to be programmed in the memory region using second program voltages increasing gradually, wherein there is a second difference between the second program voltages at two adjacent times; wherein the second difference is less than the first difference.

In some examples, a first program verify voltage of the first program operation is equal to a second program verify voltage of the second program operation.

According to some aspects of the examples of the present disclosure, a readable storage medium storing a computer program is provided, wherein the computer program when executed implements the above operation methods. The memory device may include a NAND memory, and memory cells of the NAND memory may include floating gate memory cells of a floating gate transistor, or may include charge trap memory cells of a charge trap transistor.

The storage medium may be a memory such as Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a Magnetic Surface Memory, an Optical Disk, or a Compact Disc Read-Only Memory (CD-ROM), and may also be various types of apparatuses comprising one or any combination of the above memory devices.

In some examples, an executable instruction may be written using any form of a program language (including a compiled or interpreted language, or a declarative or procedural language) in a form of a program, software, a software module, a script, or a code, and may be deployed in any form, including being deployed as a stand-alone program or as a module, a component, a subroutine, or other unit suitable for use in a computing environment.

As an example, the executable instruction may, but not necessarily, correspond to a file in a file system, may be stored in part of a file that stores other programs or data, e.g., stored in one or more scripts in a Hyper Text Markup Language (HTML) document, stored in a single file dedicated to a program under discussion, or stored in a plurality of collaborative files (e.g., files that store one or more modules, subroutines, or code parts).

As an example, the executable instruction may be deployed as being executed on one electronic apparatus, or executed on a plurality of electronic apparatuses located in one location, or executed on a plurality of electronic apparatuses distributed in a plurality of locations and interconnected a through communication network.

The above descriptions are merely example implementations of the present disclosure, and the protection scope of the present disclosure is not limited to these. Any variation or substitution that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A memory device, comprising:
 a first memory region and a second memory region, each of the first memory region and the second memory region comprising a plurality of memory cells; and a peripheral circuit coupled with the first memory region and the second memory region, wherein the peripheral circuit is configured to:
  when writing data to the first memory region, perform a first program operation on memory cells to be programmed in the first memory region by using first program voltages that increase gradually, wherein there is a first difference between the first program voltages at two adjacent times; and
  when writing data in the first memory region to the second memory region, perform a second program operation on memory cells to be programmed in the second memory region by using second program voltages that increase gradually, wherein there is a second difference between the second program voltages at two adjacent times;
  wherein the second difference is less than the first difference.

2. The memory device of claim 1, wherein the peripheral circuit is configured to:
  when the memory device is in an activated state, write data to the first memory region and perform the first program operation on the memory cells to be programmed in the first memory region; and
  when the memory device is in an idle state, write data in the first memory region to the second memory region and perform the second program operation on the memory cells to be programmed in the second memory region.

3. The memory device of claim 1, wherein a first program verify voltage of the first program operation is equal to a second program verify voltage of the second program operation.

4. The memory device of claim 1, wherein the first memory region comprises a plurality of first memory cells that store data by using a single-bit mode, and the second memory region comprises a plurality of second memory cells that store data by using a multi-bit mode.

5. The memory device of claim 1, wherein the first memory region comprises a faulty block, and the second memory region comprises a normal block.

6. The memory device of claim 1, wherein a proportion of garbage data in the first memory region is greater than a first preset proportion, and a proportion of garbage data in the second memory region is less than a second preset proportion.

7. The memory device of claim 1, wherein a number of program times of the memory cells in the first memory region is greater than a first preset number of times, and a number of program times of the memory cells in the second memory region is less than a second preset number of times.

8. The memory device of claim 1, wherein the peripheral circuit is configured to:
  after writing the data in the first memory region to the second memory region, perform an erase operation on the first memory region.

9. A memory device, comprising:
  a memory region comprising a plurality of memory cells; and
  a peripheral circuit coupled with the memory region, wherein the peripheral circuit is configured to:
    when the memory device is in an activated state, perform a first program operation on memory cells to be programmed in the memory region by using first program voltages that increase gradually, wherein there is a first difference between the first program voltages at two adjacent times; and
    when the memory device is in an idle state, perform a second program operation on memory cells to be programmed in the memory region by using second program voltages that increase gradually, wherein there is a second difference between the second program voltages at two adjacent times;
    wherein the second difference is less than the first difference.

10. The memory device of claim 9, wherein a first program verify voltage of the first program operation is equal to a second program verify voltage of the second program operation.

11. An operation method of a memory device, comprising:
  when writing data to a first memory region, performing a first program operation on memory cells to be programmed in the first memory region by using first program voltages that increase gradually, wherein there is a first difference between the first program voltages at two adjacent times; and
  when writing data in the first memory region to a second memory region, performing a second program operation on memory cells to be programmed in the second memory region by using second program voltages that increase gradually, wherein there is a second difference between the second program voltages at two adjacent times;
  wherein the second difference is less than the first difference.

12. The operation method of claim 11, wherein:
  when the memory device is in an activated state, the data is written to the first memory region, the first program operation is performed on the memory cells to be programmed in the first memory region; and
  when the memory device is in an idle state, the data in the first memory region is written to the second memory region, the second program operation is performed on the memory cells to be programmed in the second memory region.

13. The operation method of claim 11, wherein a first program verify voltage of the first program operation is equal to a second program verify voltage of the second program operation.

14. The operation method of claim 11, wherein the first memory region comprises a plurality of first memory cells that store data by using a single-bit mode, and the second memory region comprises a plurality of second memory cells that store data by using a multi-bit mode.

15. The operation method of claim 11, wherein the first memory region comprises a faulty block, and the second memory region comprises a normal block.

16. The operation method of claim 11, wherein a proportion of garbage data in the first memory region is greater than a first preset proportion, and a proportion of garbage data in the second memory region is less than a second preset proportion.

17. The operation method of claim 11, wherein a number of program times of the memory cells in the first memory region is greater than a first preset number of times, and a number of program times of the memory cells in the second memory region is less than a second preset number of times.

18. The operation method of claim 11, further comprising:
  after writing the data in the first memory region to the second memory region, performing an erase operation on the first memory region.

* * * * *